March 8, 1932. H. D. SEELINGER 1,848,977
ELECTRICALLY OPERATED STEERING GEAR
Filed Oct. 25, 1929
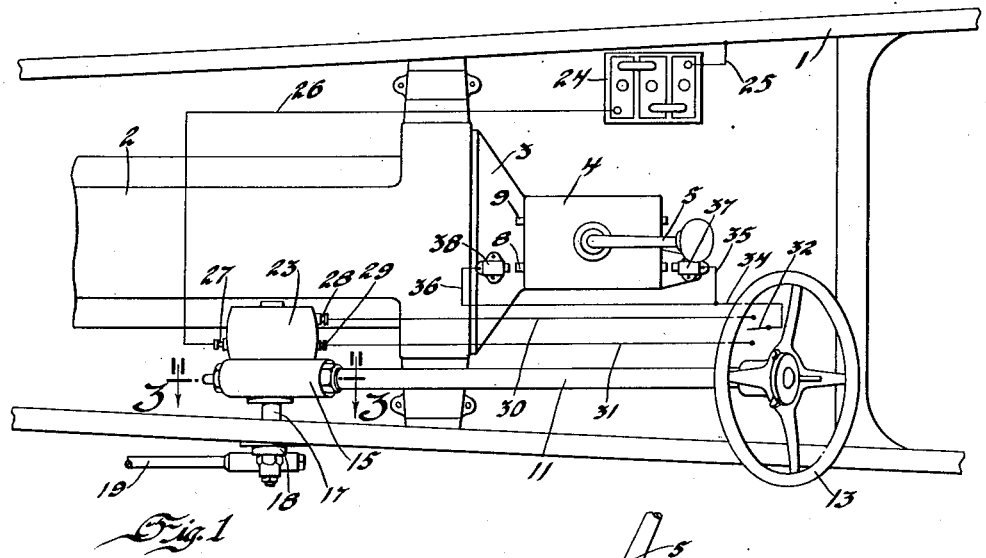
Fig. 1
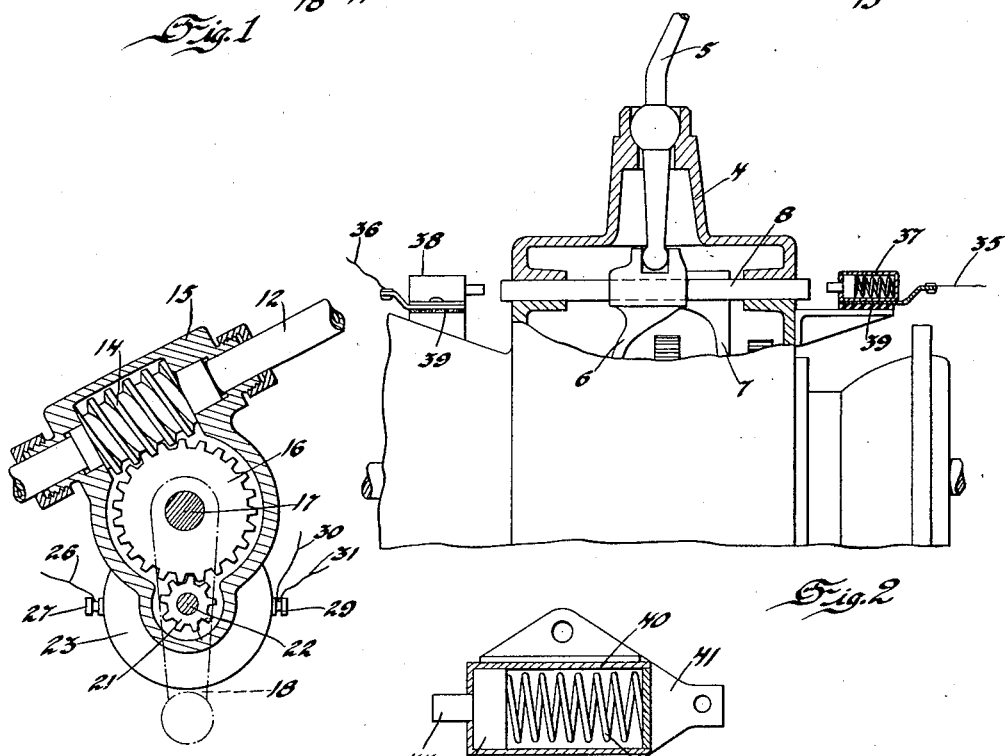
Fig. 2
Fig. 3
Fig. 4
Inventor
Horace D. Seelinger
By Blakemore, Spencer & Hulse
Attorneys Patented Mar. 8, 1932

1,848,977

UNITED STATES PATENT OFFICE

HORACE D. SEELINGER, OF DETROIT, MICHIGAN, ASSIGNOR TO GENERAL MOTORS RESEARCH CORPORATION, OF DETROIT, MICHIGAN, A CORPORATION OF DELAWARE

ELECTRICALLY OPERATED STEERING GEAR

Application filed October 25, 1929. Serial No. 402,468.

This invention relates to steering mechanism for motor vehicles and the like, and its primary object is to promote ease of steering.

It takes a great deal of manual effort to steer or control the course of a motor vehicle, particularly the large heavy duty trucks and passenger coaches, when the speed of travel is slow, or when the vehicle is manipulated in close quarters as, for example, when it is being creeped with many sudden turns to and fro into or out of limited size parking spaces. At the higher speeds after the car has gained momentum, the guiding wheels swing more freely because of their fast rotation over the road surface, and usually the amount they must swing to keep the vehicle in a straight line is quite small. Therefore, under ordinary running conditions little manual effort need be expended to maintain the car under control while continuous or frequent slow vehicle movement with many turns is quite tiresome and a drain on the operator's strength.

Attempts have been made to substitute power steering for the conventional manually operated mechanism. However, the power systems heretofore provided were not always fool-proof, nor positive in action, nor instantly responsive especially throughout the higher speed range.

To facilitate ease of control, it is proposed according to the present invention to combine the advantages of power and hand steering, by the provision of conventional manual steering apparatus for guiding the vehicle at higher speeds and the association therewith of a power operated booster to relieve the driver of the work of steering when the going is slow and at a time when his attention must be divided and partly given to the manipulation of other control parts.

To this end there is contemplated in the preferred embodiment of the invention, as applied to a vehicle with an engine having the usual type of change speed transmission gearing, the addition of an electric booster motor to the conventional steering gear, to which current is conducted through a circuit that can be closed only when the transmission gearing is in the reverse or low speed setting. In other words, there is afforded a combined manual and power steering system wherein the steering is by manual effort alone at such times as the transmission gears are in their higher speed settings, when steering is comparatively easy and under undivided attention of the driver, and is effected through power means when the vehicle movement first commences either forward or backward with the gears in low or reverse speed settings, and at a time when the driver must not only exercise care in steering but also concurrently manipulate such other controls as the clutch, brake and gear shift mechanisms. This arrangement also has the advantage, that in the event something should happen to the booster system whereby it becomes inoperative, the vehicle may still be steered by manual effort.

The invention will be better understood upon reference to the accompanying drawings wherein Figure 1 is a top plan view of a portion of a chassis frame illustrating an application of the invention.

Figure 2 is a fragmentary side elevation of the transmission housing with parts thereof shown in section.

Figure 3 is a sectional view on line 3—3 of Figure 1.

Figure 4 is an enlarged detail sectional view of a contact member.

Referring to the drawings, the numeral 1 indicates a chassis frame in which is supported the power plant 2 shown as an ordinary internal combustion engine, having a clutch housing 3 and transmission housing 4 associated therewith. Extending upwardly from the transmission housing 4 is the manually operated shift lever 5 which is swiveled in the upper end of the housing for swinging movement to and fro, and fore and aft, to engage and shift either of a pair of shifter forks 6 and 7 carried respectively by rods 8 and 9 having sliding bearings in the end walls of the transmission housing, and projecting slightly there beyond. Other types of change speed transmission gearing may be employed but for the purpose of illustration, a standard change speed transmission having one reverse speed and three forward speeds is shown. As will be readily understood, the shifter fork 6 controls the reverse speed and the low or first forward speed while the fork 7 controls the intermeshing of gears which give the second or intermediate speed and the high or third speed.

Also mounted in the chassis frame is a steering column 11 inclosing a rotatable shaft 12 having at one end a hand wheel 13 and at its opposite end a worm 14 inclosed within the housing 15 at the bottom of the steering column 11 and engaged with a worm gear 16. The gear 16 is fixed or keyed on a rock shaft 17 which extends laterally and has mounted thereon the pitman arm 18 connected through the drag bar 19 with front wheel steering linkage whereby the wheels are guided on the manual manipulation of the hand wheel 13.

Also in meshing relation with the gear 16, is a pinion gear 21 secured on the end of the armature shaft 22 that forms a part of the electric booster motor 23. This motor 23 is so constructed and arranged that it may be operated in opposite directions in order to steer the vehicle to the right or left through the connection with the conventional steering mechanism by the gears 21 and 16. Current is supplied from the usual storage battery 24 having one terminal grounded to the frame through the line or conduit 25, and the other terminal connected through the conductor wire 26 with a connector stud 27 of the motor 23. The motor is also provided with connector terminals 28 and 29 of oppositely wound field coils, whereby the motor may be rotated in either direction, these being connected through lead wires 30 and 31 respectively, with a two way switch 32. This switch is adapted to individually communicate the lines 30 and 31 with the conduit or cable 34 from which branch lines 35 and 36 lead to a pair of contact elements 37 and 38, positioned adjacent and in spaced relation with the opposite ends of the shifter rod 8. The engagement with either of the contacts by the rod 8 when positioned at its forward or rearward limit grounds the line 34 to complete the circuit, when the switch 32 is in either of its closed positions. Each contact element 37 and 38 is insulated from its support by means of an insulating plate or disc 39 as shown in Figure 2. These contact parts may be substantially identical and constructed along the lines indicated in the detail view, Figure 4, wherein there is shown a housing member 40 having attachment flanges 41 and inclosing a coiled expansion spring 42 that bears against a head or disc 43 from which projects through the end wall of the housing a stem 44. The spring 42 serves to yieldingly urge the head 43 toward the adjacent end wall of the casing 40 and is compressed slightly when the end of the rod 8 is moved into engagement with the stem 44 to thereby insure a tight electrical contact.

The switch 32 may be thrown to opened or closed positions by the driver or it may be arranged for automatic operation upon turning movement of the steering shaft. In either event the actuation of the motor 23 can be effected only when the shifter rod 8 is moved to one or the other of its extreme opposite limits, in which case the gears are set in either low or reverse positions. Thus, when steering is difficult, use may be made of the booster to relieve the driver of tiring strains. Obviously, other than an electrically operated booster may be employed. For example pneumatic or hydraulic systems may be substituted, in which case a control valve for the power transmitting line would be employed in association with the gear shifting mechanism.

I claim:

1. In a motor vehicle or the like, the combination with steering apparatus and gear shifter mechanism having shifter rods, of an electrically operated booster associated with the steering apparatus, a current conducting circuit for said device and a contact element in said circuit positioned adjacent one of the shifter rods for engagement therewith when in gear set position to complete the circuit.

2. In a motor vehicle or the like, the combination with steering apparatus and gear shifter mechanism having a shifter rod, of an electrically operated booster device for the steering apparatus, an electric circuit for said device and means associated with said rod to close the circuit when the rod is shifted to gear set position.

3. In a motor vehicle or the like, the combination with steering apparatus and gear change mechanism, of a booster device for said steering apparatus and means automatically controlled by the gear change mechanism to govern transmission of power to said booster drive.

4. In a motor vehicle or the like, the combination with a power plant having a transmission control device associated therewith and a manually operated steering apparatus, of a booster for said steering apparatus, and means to preclude action of the booster when the device is in other than a predetermined operative position.

5. In a motor vehicle or the like, the combination with a power plant having a transmission gear set, and a manually operated steering apparatus, of a booster for said apparatus, and means rendered effective by a predetermined setting of the transmission gears, to make the booster actionable.

6. In a motor vehicle or the like, the combination with a power plant having a transmission gear set, and a manually operated steering apparatus, of a booster for said apparatus, and means controlling delivery of power to the booster, adapted to be made effective with the transmission gearing in a predetermined setting.

7. In a motor vehicle or the like, the combination with steering apparatus and a gear set, of a power device for operating the steering apparatus, and means associated with an element of the gear set and automatically operated thereby when the gears are in a predetermined setting to permit delivery of power to said device.

8. In a motor vehicle or the like, the combination with an engine and vehicle steering apparatus, of a booster for operating said apparatus, a power transmitting connection for the booster and an engine control device, adapted upon actuation to a given position to close said connection for power transmission.

9. In a motor vehicle or the like, the combination with manual steering apparatus and shifter mechanism for transmission gearing, of a booster device associated with the steering apparatus, and a switch controlling transmission of power to the booster device, and operated automatically by the shifter mechanism to close the power connection when the shifter mechanism is moved to a given position.

10. Steering apparatus for motor vehicles including power operating means for steering the vehicle under predetermined conditions independent of the rate of engine rotation, control means operatively associated with a vehicle control device for governing the operation of said power means dependent upon vehicle control device position and provided with a part under manual control for governing time and direction of force applied by said power operating means, and manual operating means for steering the vehicle independent of said power operating means.

11. Steering apparatus for motor vehicles including power operating means for steering the vehicle under predetermined conditions independent of the rate of engine rotation, a power transmission line for transmitting power to operate the same, means governed by a vehicle control device to open or close a portion of said power transmission line automatically with predetermined settings of the vehicle control device, and other means manually operated to open or close another portion of the line, whereby the transmission of power through the line is dependent upon the existence of a clear path through both of said line portions, and manual operating means for steering the vehicle independent of said power operating means.

In testimony whereof I affix my signature.

H. D. SEELINGER.